United States Patent Office

2,834,675
Patented May 13, 1958

2,834,675

POLYALKYLENE-POLYAMINE RESINOUS COMPOSITION, METHOD OF MAKING PAPER USING SAME AND PAPER CONTAINING SAME

Yun Jen and Sewell T. Moore, Stamford, Conn., assignors to American Cyanamid Company, New York, N. Y., a corporation of Maine No Drawing. Application July 22, 1954
Serial No. 445,169

20 Claims. (Cl. 92—3)

This invention relates to a novel resinous composition. Further, this invention relates to the employment of the novel resinous composition in the preparation of paper of improved wet strength. More particularly, this invention relates to the resinous compositions, their method of production and articles produced therefrom.

The novel resinous composition of our invention is prepared from a dihaloalkane and a polyalkylene polyamine as will be discussed more fully hereinbelow. The composition is a water-soluble material, is stable and may be added to cellulosic webs during the preparation of paper at acidic, neutral or alkaline pH.

Many materials have been suggested in the prior art as additives to paper for the improvement of the strength properties thereof. At the present time the most widely accepted commercial additives to paper for the improvement of the dry and wet strength thereof are added to the cellulosic web during the beater process at an acid pH. Inasmuch as acid conditions have a tendency to corrode the equipment employed, it is desirable to have an additive that may be combined with the cellulosic web during the paper formation at a substantially neutral or slightly alkaline pH. Polyethyleneimine has been suggested for use in the preparation of wet strength paper at alkaline pH values but, due to the toxicity of the monomers and the high cost of polymer preparation, this material has not found general commercial acceptance. We have now found that a novel resinous composition may be prepared by the reaction of a dihaloalkane and a polyalkylene polyamine which may be added during the formation of the paper in order to impart improved wet strength properties thereto.

It is therefore an object of our invention to produce a novel resinous composition. It is a further object of our invention to employ the novel resinous composition at substantially neutral or alkaline pH during the preparation of a paper of improved wet strength. These and other objects of our invention will be discussed more fully hereinbelow.

In the preparation of the novel resinous compositions, a dihaloalkane represented by the general formula $$X—C_nH_{2n}—X$$

wherein X is a halogen having an atomic weight greater than 35 and $n$ is an integer of not more than 4 and containing at least 2 and not more than 3 chain carbon atoms between the halogen atom thereof is reacted with a polyalkenylene polyamine represented by the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, $m$ is an integer of at least 2 and $p$ is an integer of from 0 to 4. This reaction is run at least to substantial completion so that the product contains no organically bound halogen. When reaction is substantially complete, a polyalkylene polyamine is obtained which, as an aqueous syrup contains 60–65% total resin solids, has a viscosity substantially higher than $Z_6$ on the Gardner-Holdt scale at 25° C. which is equivalent to a viscosity of more than about A on said scale when diluted with water to about 33% resin solids. Inasmuch as it is not convenient to measure the viscosity at 60–65% resin solids, the viscosity of the high-molecular weight polyalkylene polyamine will be described herein in terms of their viscosity at 33% resin solids. Resin solids of the high-molecular weight polyalkylene polyamine solution obtained by reacting the dihaloalkane with the alkylene polyamine is determined by totaling the weight of the material employed and any water added, deducting the weight of the hydrogen halide formed and dividing by the total weight of the solution.

Polyalkylene polyamines falling within the scope of the general formula set forth above are such as 1,2-ethylenediamine; trimethylenediamine; 1,2-propylenediamine; 1,2-butylenediamine; 1,3-butylenediamine; 1,4-butylenediamine; diethylenetriamine; triethylenetetraamine; tetraethylenepentamine; N,methyl-N,N-bis-(3-aminopropyl)-amine; N,butyl-N,N-bis(3-aminopropyl)amine; 3,3'-iminobis propylamine; 3,3',3''-nitrilo-trispropylamine; 1,5-pentanediamine; N,N-dimethyl-3,4-iminobis propylamine; 1,6-hexanediamine; and the like. The polyalkylene polyamine employed should contain at least two chain carbon atoms. In the general formula set forth above it is preferred that $m$ be an integer of from 2 to 4 chain carbon atoms. The alkylene groups may be substituted by nonionic groups but the polyalkylene polyamine, as a whole, should be water-soluble. Preferred amines are those which are essentially composed of the lower alkylene linkages such as $$—HN—CH_2—CH_2—NH—$$

or $$—HN—CH_2—CH_2—CH_2—NH—$$

since these amines are readily available, freely water-soluble and yield ultimate resins having desired properties. The dihaloalkanes which may be employed in the process of our invention are those in which the halogen has an atomic weight greater than 35, e. g., chlorine, bromine and iodine. If desired, the dihaloalkanes may also contain substituted groups as, for example, cyano, carboxylic acid, carboxylate, hydroxyl and the like. Representative compounds are such as 1,2-dichloroethane; 1,2-dibromoethane; 1,2-diiodoethane; 1,2-dichloropropane; 1,3-dichloropropane; 1,3-dibromopropane; 1,3-diiodopropane; 1-cyano-1,2-dichloroethane; 1-carboxyl-1,2-dichloroethane; and the like. These dihaloalkanes have a total of not more than 4 carbon atoms and contain at least 2 and not more than 3 chain carbon atoms between the halogen atoms thereof. Each of the reactants may also contain ether or thioether linkages in the structure thereof.

The dihaloalkane and the polyalkylene polyamine are reacted in a molar proportion of from about 0.5:1.0 to about 1.2:1.0, respectively. The initial reactants are so chosen that the sum of the chain carbon atoms represented by $m$ and $n$ in the general formulas is an integer of at least 5. Preferably, the sum of the chain carbon atoms represented by $m$ and $n$ in the general formulas is an integer of from 5 to 6. Therefore, it will be seen that the reaction product of compounds such as 1,2-dihaloalkane and a polyethylene polyamine such as diethylenetriamine falls outside of the scope of this invention and should be avoided in order to obtain optimum results. We have found that, when the sum of the chain carbon atoms in the reaction product is less than 5, there is a tendency for cyclic compounds to be formed during the condensation reaction. The formation of six-membered cyclic compounds when the sum of the chain carbon atoms is 4 would limit the molecular weight of the ultimate reaction product to a relatively small value and is therefore to be avoided. In order to assure that there will be no six-numbered cyclic group formation in the condensation product of our invention, it is necessary that the sum of the chain carbon atoms therein, as represented by $n$ and $m$ in the general formula, be at least 5 and preferably 5 or 6. By judiciously selecting the reactants employed, it is possible to obtain a reaction product free of six-membered cyclic groups.

Reaction between the dihaloalkane and the polyalkylene polyamine is carried out at a temperature ranging from about 25° C. to reflux, preferably from about 50° C. to reflux. Since the reaction proceeds more rapidly at elevated temperatures, it is preferred that temperatures higher than room temperature be employed. Reaction is continued at this temperature until the condensation product reaches a viscosity at 33% resin solids measured at 25° C. on the Gardner-Holdt scale within the order of from about A to about $Z_6$, preferably from about H to about Z. During the formation of the high-molecular weight polyalkylene polyamine, it is preferred that the mol ratio of dihaloalkane to polyalkylene polyamine be within the order of from about 0.7:1.0 to about 1.0:1.0, respectively. The reaction is carried out until there is substantially no free dihaloalkane present in the reaction mixture. This reaction is advantageously carried out by the use of water, water-soluble alcohols or mixtures thereof as solvents. When the amount of acid formed during the reaction is large compared to the number of nitrogen atoms present, an acid acceptor such as triethanolamine, triethylamine, N-methylmorpholine and the like may be used.

It will be realized that, when a compound containing 3 chain carbon atoms such as trimethylenediamine is reacted with a compound containing 2 chain carbon atoms such as 1,2-dichloroethane, a chain is formed which contains ethylenic linkages. The 1,2-dichloroethane may then be reacted with the nitrogen atoms terminating these ethylenic linkages and forming six-membered cyclic groups in the compound. However, repeated tests have shown that the ultimate properties of the resinous composition formed from reacting initially a 3 chain carbon polyamine (or dihaloalkane) with a 2 chain carbon dihaloalkane (or polyamine) are such that, when compared with the properties of a resinous composition prepared from reacting initially a 2 chain carbon polyamine with a 2 chain carbon dihaloalkane, ring formation occurs to a very limited or minimal extent, if at all. It has been found that, when a 2 chain carbon polyamine such as ethylenediamine is reacted with a 2 chain carbon dihaloalkane such as ethylene dichloride, excess six-membered ring formation occurs which limits the molecular weight and corresponding viscosity of the product attainable. By our invention, products substantially free of cyclic groups and possessing high-molecular weights are readily obtained. The reaction product obtained may be acidic, akaline or even neutral, depending on the relative number of halogen and amino groups present in the initial reactants. If desired, the material may be made alkaline by the addition of a suitable material such as sodium hydroxide, potassium hydroxide and the like to liberate the free amine. The reaction is preferably carried out until there are no organically bound halogen atoms present. The material is usually slightly alkaline or neutral. The resinous composition is water-soluble and is also stable. The resinous syrup may be diluted with water to any desired solids content for employment in the preparation of paper having improved dry and wet strength. If desired, the resinous syrup may be spray dried to yield a composition that may be stored in a solid form. While the material is particularly useful in the preparation of wet strength papers, the composition may also be used in the preparation of textiles, cellophane and the like.

In order that those skilled in the art may more fully understand the inventive concept herein presented, the following examples are given by way of illustration and not limitation unless otherwise noted in the appended claims. All parts are parts by weight.

RESIN A 131.2 parts of 3,3'-iminobispropylamine were diluted with 250 parts of demineralized water and reacted with 99 parts of ethylene dichloride. The reaction was carried out at the reflux temperature of the mixture. After 7 hours, the temperature had reached 89° C. and the viscosity of the reaction product measured at 33% resin solids at 25° C. on the Gardner-Holdt scale was $Z_2$. The resinous syrup was then neutralized with 80 parts of sodium hydroxide and diluted to 4% resin solids with water.

RESIN B

A similar resinous composition was made in the same manner as set forth in the preparation of resin A except that 100 parts of demineralized water were employed and the salt formed was removed from the reaction product. The reaction was stopped after 5 hours' refluxing by cooling and then neutralizing with sodium hydroxide. The reaction product was precipitated in acetone and dissolved in ethanol. The salt was then removed from the reaction product by centrifuging. Alcohol was removed by evaporation and the free amine dissolved in water. The aqueous resin syrup containing 10.5% resin solids had a viscosity of A on the Gardner-Holdt scale when measured at 25° C.

RESIN C

A resinous composition was made in accordance with the procedure followed in the preparation of resin A except that the resinous syrup had a viscosity of U when measured on the Gardner-Holdt scale at 19.3% resin solids and at 25° C.

RESIN D 3330 parts of ethylene dichloride were mixed with 200 parts of water. While stirring, 524.8 parts of 3,3'-iminobispropylamine were introduced. The heat of solution of the amine raised the mixture temperature from 25° C. to 56° C. The reaction mixture was then refluxed for 3 hours and the resinous product at 58% resin solids concentration attained a viscosity beyond the Gardner-Holdt scale. On dilution of the product to 33% resin solids, the viscosity measured at 25° C. on the Gardner-Holdt scale had a viscosity of F.

RESIN E 56.5 parts of trimethylene dichloride, 62 parts of water and 73 parts of triethylene tetramine were reacted at mild refluxing to cause condensation. After 3 hours, the reaction was virtually complete and the product was diluted with 157 parts of water. The polymer syrup containing 33% resin solids had a viscosity of D on the Gardner-Holdt scale when measured at 25° C.

RESIN F 71.5 parts of N-methyl-N,N-bis(3-aminopropyl)amine (0.5 mol), 44.6 parts of ethylene dichloride (0.45 mol) and 20 parts of water were reacted at reflux temperature for 2 hours. At the beginning of the reaction, the reflux temperature was 90° C. It gradually rose to about 126° C. at the end of the reaction period. Another portion of water in an amount of 112 parts was added when the reaction was completed so that the syrup now contained a theoretical resin content of 33%. The viscosity when measured on the Gardner-Holdt scale was J.

COMPARATIVE RESIN G 99 parts of 1,2-dichloroethane, 50 parts of water and 146 parts of triethylene tetramine were mixed together and slowly heated to reflux. The solution was refluxed for about 3 hours, then cooled and diluted with 200 parts of water to a resin solids content of 34.6%. The viscosity on the Gardner-Holdt scale at 25° C. was between $A_1$ and A.

In the preparation of paper employing the resinous composition, the cellulosic webs are most conveniently manufactured by first forming a dilute aqueous dispersion or solution of the resin. No aging or pH adjustment of the reaction product is required. The solution is then added to an aqueous suspension of normally beaten cellulosic fibers. The resin in substantial part is rapidly adsorbed by the fibers. The fibers are sheeted in the ordinary way and the resulting webs heated to dry the same and develop the strengthening properties of the web. Inasmuch as no heat is required to cure the resinous composition, the only heat necessary is that amount required to remove the water from the sheeted fibers. Alternatively, the resin may be applied by the tub-sizing method wherein a preformed cellulosic web is dipped into, sprayed or padded with a dilute solution of the resin. The paper is then heated and dried as described. When the paper carries as little as 0.5% by weight of the resin, based on the dry weight of the cellulosic fibers, a noticeable improvement in wet strength takes place. Up to about 5% of the resin may be added with continued increase in wet strength developed but the greatest increase in strength produced per unit weight of resin added takes place within the range of from about 1% to about 3% by weight, based on the dry weight of the cellulosic fibers. Therefore, the latter range is the preferred amount of the novel resinous composition employed.

Inasmuch as the novel resinous compositions of our invention are insensitive to the presence of normal amounts of dissolved sulfate ions, the suspension may be made acid by addition of aluminum sulfate or sulfuric acid. Thus, the resins may be employed in acidic systems wherein the fibers are sized with rosin or other soap or anionic size precipitated by alum, which furnishes large amounts of sulfate ions. In such systems the anionic size may be added first, then the alum which precipitates the size and acidifies the fibrous suspension to a pH of about 4 to 6 is added and finally the wet strength resin of the present invention is added at a point near the paper making wire. As previously stated, the resinous compositions herein prepared may also be added to the cellulosic webs during the formation of the paper at an alkaline pH.

The following example sets forth the advantages realized by employing the present resinous composition in the preparation of paper wherein the resinous composition is added at an alkaline pH.

*Example 1*

40 parts, on a dry weight basis, of bleached northern kraft pulp beaten to a freshness of about 400 milliliters (Green) were treated with 30 parts of a 4% solution of resin A. The amount of resin A employed was 3% by weight, based on the dry weight of the fibers. The pH was adjusted to 9.0 with 2% sodium hydroxide. Handsheets were made from the treated pulp using dilution water adjusted to a pH of 9.0. The sheets were pressed and diluted. After conditioning at 50% relative humidity and 73° F., the sheets were tested for wet and dry tensile strength and basis weight. For comparison, sheets were made from untreated pulp.

Handsheets were also prepared as described above from pulp treated with 3% by weight, based on the dry weight of resins B and C. The results obtained are set forth in the following table:

| Resin | Percent Added | Tensile Strength [1] | |
|---|---|---|---|
| | | Dry | Wet [2] |
| A | 3.0 | 32.9 | 6.7 |
| B | 3.0 | 30.4 | 5.5 |
| C | 3.0 | 31.6 | 6.3 |
| F | 3.0 | 30.8 | 3.2 |
| G | 3.0 | 28.7 | 0.4 |
| Control | | 28.0 | 0.4 |

[1] Lbs./in., corrected to 50 pounds basis weight.
[2] After 16-hour soak in the ionized water at 73° F.

We claim:

1. A resinous composition of matter having a viscosity of from about A to about $Z_6$ at 33% resin solids measured at 25° C. on the Gardner-Holdt scale which comprises the reaction product of a dihaloalkane having the general formula $$X-C_nH_{2n}-X$$

wherein X is a halogen having an atomic weight greater than 35 and n is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, m is an integer of at least 2 and p is an integer of from 0 to 4, in a mol ratio of from about 0.5:1 to about 1.2:1, respectively, and wherein the sum of the chain carbon atoms of said dihaloalkane and said polyamine is an integer of at least 5.

2. A resinous composition of matter having a viscosity of from about A to about $Z_6$ at 33% resin solids measured at 25° C. on the Gardner-Holdt scale which comprises the reaction product of a dihaloalkane having the general formula $$X-C_nH_{2n}-X$$

wherein X is a halogen having an atomic weight greater than 35 and n is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, m is an integer of from 2 to 4 and p is an integer of from 0 to 4, in a mol ratio of from about 0.5:1 to about 1.2:1, respectively, and wherein the sum of the chain carbon atoms of said dihaloalkane and said polyamine is an integer of from 5 to 6.

3. A resinous composition of matter having a viscosity of from about H to about Z at 33% resin solids measured at 25° C. on the Gardner-Holdt scale which comprises the reaction product of a dihaloalkane having the general formula $$X-C_nH_{2n}-X$$

wherein X is a halogen having an atomic weight greater than 35 and n is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, m is an integer of from 2 to 4 and p is an integer of from 0 to 4, in a mol ratio of from about 0.5:1 to about 1.2:1, respectively, and wherein the sum of the chain carbon atoms of said dihaloalkane and said polyamine is an integer of from 5 to 6.

4. A resinous composition of matter having a viscosity of from about A to about $Z_6$ at 33% resin solids measured at 25° C. on the Gardner-Holdt scale which comprises the reaction product of a dihaloalkane having the general formula $$X-C_nH_{2n}-X$$

wherein X is a halogen having an atomic weight greater than 35 and n is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, $m$ is an integer of at least 2 and $p$ is an integer of from 0 to 4, in a mol ratio of from about 0.7:1 to about 1:1, respectively, and wherein the sum of the chain carbon atoms of said dihaloalkane and said polyamine is an integer of at least 5.

5. A resinous composition of matter having a viscosity of from about A to about $Z_8$ at 33% resin solids measured at 25° C. on the Gardner-Holdt scale which comprises the reaction product of a dihaloalkane having the general formula $$X—C_nH_{2n}—X$$

wherein X is a halogen having an atomic weight greater than 35 and $n$ is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, $m$ is an integer of from 2 to 4 and $p$ is an integer of from 0 to 4, in a mol ratio of from about 0.7:1 to about 1:1, respectively, and wherein the sum of the chain carbon atoms of said dihaloalkane and said polyamine is an integer of from 5 to 6.

6. A resinous composition of matter having a viscosity of from about H to about Z at 33% resin solids measured at 25° C. on the Gardner-Holdt scale which comprises the reaction product of a dihaloalkane having the general formula $$X—C_nH_{2n}—X$$

wherein X is a halogen having an atomic weight greater than 35 and $n$ is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, $m$ is an integer of from 2 to 4 and $p$ is an integer of from 0 to 4, in a mol ratio of from about 0.7:1 to about 1.2:1, respectively, and wherein the sum of the chain carbon atoms of said dihaloalkane and said polyamine is an integer of from 5 to 6.

7. A resinous composition of matter having a viscosity of from about A to about $Z_6$ at 33% resin solids measured at 25° C. on the Gardner-Holdt scale which comprises the reaction product of ethylene dichloride and 3,3'-iminobispropylamine in a mol ratio of from about 0.5:1 to about 1.2:1, respectively.

8. A resinous composition of matter having a viscosity of from about H to about Z at 33% resin solids measured at 25° C. on the Gardner-Holdt scale which comprises the reaction product of ethylene dichloride and 3,3'-iminobispropylamine in a mol ratio of from about 0.7:1 to about 1:1, respectively.

9. A process for preparing a water-soluble high-molecular weight resinous composition which comprises reacting in an aqueous medium a dihaloalkane having the general formula $$X—C_nH_{2n}—X$$

wherein X is a halogen having an atomic weight greater than 35 and $n$ is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}HN_2$$

wherein Y is selected from the group consisting of H, alkyl radicals containing from 1 to 4 carbon atoms and $C_mH_{2m}NH_2$, $m$ is an integer of at least 2 and $p$ is an integer of from 0 to 4, in a mol ratio of from about 0.5:1 to about 1.2:1, respectively, at a temperature ranging from about 25° C. to reflux until the reaction product has a viscosity within the range of from about A to about $Z_6$ at 33% resin solids measured at 25° C. on the Gardner-Holdt scale and wherein the sum of the chain carbon atoms of said dihaloalkane and said polyamine employed is in integer of at least 5.

10. A process for preparing a water-soluble high-molecular weight resinous composition which comprises reacting in an aqueous medium a dihaloalkane having the general formula $$X—C_nH_{2n}—X$$

wherein X is a halogen having an atomic weight greater than 35 and $n$ is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, $m$ is an integer of from 2 to 4 and $p$ is an integer of from 0 to 4, in a mol ratio of from about 0.7:1 to about 1:1, respectively, at a temperature ranging from about 50° C. to reflux until the reaction product has a viscosity within the range of from about H to about Z at 33% resin solids measured at 25° C. on the Gardner-Holdt scale and wherein the sum of the chain carbon atoms of said dihaloalkane and said polyamine employed is an integer of from 5 to 6.

11. A process for preparing a water-soluble high-molecular weight resinous composition which comprises reacting in an aqueous medium ethylene dichloride and 3,3'-iminobispropylamine in a mol ratio of from about 0.5:1 to about 1.2:1, respectively, at a temperature ranging from about 25° C. to reflux until the reaction product has a viscosity within the range of from about A to about $Z_6$ at 33% resin solids measured at 25° C. on the Gardner-Holdt scale.

12. A process for preparing a water-soluble high-molecular weight resinous composition which comprises reacting in an aqueous medium ethylene dichloride and 3,3'-iminobispropylamine in a mol ratio of from about 0.7:1 to about 1:1, respectively, at a temperature ranging from about 50° C. to reflux until the reaction product has a viscosity within the range of from about H to about Z at 33% resin solids measured at 25° C. on the Gardner-Holdt scale.

13. Paper composed of cellulosic fibers having uniformly adsorbed therein a resinous composition in an amount of from about 0.5% to about 5% by weight, based on the dry weight of said fibers, and having a viscosity of from about A to about $Z_6$ at 33% resin solids measured at 25° C. on the Gardner-Holdt scale which comprises the reaction product of a dihaloalkane having the general formula $$X—C_nH_{2n}—X$$

wherein X is a halogen having an atomic weight greater than 35 and $n$ is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, $m$ is an integer of at least 2 and $p$ is an integer of from 0 to 4, in a mol ratio of from about 0.5:1 to about 1.2:1, respectively, and wherein the sum of the chain carbon atoms of said dihaloalkane and said polyamine is an integer of at least 5.

14. Paper composed of cellulosic fibers having uniformly adsorbed thereon a resinous composition in an amount of from about 1% to about 3% by weight, based on the dry weight of said fibers, and having a viscosity of from about H to about Z at 33% resin solids measured at 25° C. on the Gardner-Holdt scale which comprises the reaction product as a dihaloalkane having the general formula $$X-C_nH_{2n}-X$$

wherein X is a halogen having an atomic weight greater than 35 and $n$ is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, $m$ is an integer of from 2 to 4 and $p$ is an integer of from 0 to 4, in a mol ratio of from about 0.5:1 to about 1.2:1, respectively, and wherein the sum of the chain carbon atoms of said dihaloalkane and said polyamine is an integer of from 5 to 6.

15. Paper composed of cellulosic fibers having uniformly adsorbed thereon a resinous composition in an amount of from about 0.5% to about 5% by weight, based on the dry weight of said fibers, and having a viscosity of from about A to about $Z_6$ at 33% resin solids measured at 25° C. on the Gardner-Holdt scale which comprises the reaction product of ethylene dichloride and 3,3'-iminobispropylamine in a mol ratio of from about 0.5:1 to about 1.2:1, respectively.

16. Paper composed of cellulosic fibers having uniformly adsorbed thereon a resinous composition in an amount of from about 1% to about 3% by weight, based on the dry weight of said fibers, and having a viscosity of from about H to about Z at 33% resin solids measured at 25° C. on the Gardner-Holdt scale which comprises the reaction product of ethylene dichloride and 3,3'-iminobispropylamine in a mol ratio of from about 0.7:1 to about 1:1, respectively.

17. A method of manufacturing paper of improved wet strength which comprises dispersing into an aqueous suspension of papermaking cellulose fibers from 0.5% to 5% by weight, based on the dry weight of the fibers, a resinous composition of matter having a viscosity of from about A to about $Z_6$ at 33% resin solids measured at 25° C. on the Gardner-Holdt scale which comprises the reaction product of a dihaloalkane having the general formula $$X-C_nH_{2n}-X$$

wherein X is a halogen having an atomic weight greater than 35 and $n$ is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, $m$ is an integer of at least 2 and $p$ is an integer of from 0 to 4, in a mol ratio of from about 0.5:1 to about 1.2:1, respectively, and wherein the sum of the chain carbon atoms of said dihaloalkane and said polyamine is an integer of at least 5.

18. A method of manufacturing paper of improved wet strength which comprises dispersing into an aqueous suspension of papermaking cellulose fibers from 1% to 3% by weight, based on the dry weight of the fibers, a resinous composition of matter having a viscosity of from about H to about Z at 33% resin solids measured at 25° C. on the Gardner-Holdt scale which comprises the reaction product of a dihaloalkane having the general formula $$X-C_nH_{2n}-X$$

wherein X is a halogen having an atomic weight greater than 35 and $n$ is an integer of not more than 4 and containing at least 2 and not more than 3 chain carbon atoms between the halogen atoms thereof, and a polyalkylene polyamine having the general formula $$H_2N(C_mH_{2m}NY)_pC_mH_{2m}NH_2$$

wherein Y is selected from the group consisting of H, alkyl radicals containing from 1 to 4 carbon atoms and $C_mH_{2m}NH_2$, $m$ is an integer of from 2 to 4 and $p$ is an integer of from 0 to 4, in a mol ratio of from about 0.5:1 to about 1.2:1, respectively, and wherein the sum of the chain carbon atoms of said dihaloalkane and said polyamine is an integer of from 5 to 6.

19. A method of manufacturing paper of improved wet strength which comprises dispersing into an aqueous suspension of papermaking cellulose fibers from 0.5% to 5% by weight, based on the dry weight of the fibers, a resinous composition of matter having a viscosity of from about A to about $Z_6$ at 33% resin solids measured at 25° C. on the Gardner-Holdt scale which comprises the reaction product of ethylene dichloride and 3,3'-iminobispropylamine in a mol ratio of from about 0.5:1 to about 1.2:1, respectively.

20. A method of manufacturing paper of improved wet strength which comprises dispersing into an aqueous suspension of papermaking cellulose fibers from 1% to 3% by weight, based on the dry weight of the fibers, a resinous composition of matter having a viscosity of from about H to about Z at 33% resin solids measured at 25° C. on the Gardner-Holdt scale which comprises the reaction product of ethylene dichloride and 3,3'-iminobispropylamine in a mol ratio of from about 0.7:1 to about 1:1, respectively.

References Cited in the file of this patent

UNITED STATES PATENTS

| | | |
|---|---|---|
| 2,595,935 | Daniel et al. | May 6, 1952 |
| 2,616,874 | Yost et al. | Nov. 4, 1952 |

UNITED STATES PATENT OFFICE
CERTIFICATE OF CORRECTION

Patent No. 2,834,675                                              May 13, 1958

Yun Jen et al.

It is hereby certified that error appears in the printed specification of the above numbered patent requiring correction and that the said Letters Patent should read as corrected below.

Column 2, line 42, for "carboylate" read -- carboxylate --; column 3, line 54, for "akaline" read -- alkaline --; column 7, line 71, for "$HN_2$" read -- $NH_2$ --; column 8, line 72, for "1,2:1" read -- 1.2:1 --; column 9, line 6, for "as" read -- of --.

Signed and sealed this 16th day of September 1958.

(SEAL)
Attest:

KARL H. AXLINE                                                    ROBERT C. WATSON
Attesting Officer                                             Commissioner of Patents